UNITED STATES PATENT OFFICE.

PHILIPP GEORGE RICHTER, OF ST. LOUIS, MISSOURI.

FOOD PREPARATION AND PROCESS OF PRESERVING SAME.

SPECIFICATION forming part of Letters Patent No. 669,808, dated March 12, 1901.

Application filed December 3, 1900. Serial No. 38,546. (No specimens.)

*To all whom it may concern:*

Be it known that I, PHILIPP GEORGE RICHTER, physician, a citizen of the United States, and a resident of the city of St. Louis, in the State of Missouri, have invented certain new and useful Improvements in Food Preparations and Processes of Preserving Food and Similar Articles, of which the following is a specification.

My invention relates to a process of preserving food and other articles; and it consists principally in dissolving gelatin in a liquid containing the valuable ingredients and drying the mixture.

It also consists in eliminating all parts of the article which have no value.

It also consists in the new food preparation hereinafter described and claimed.

Liquid foods generally consist of solids dissolved or suspended in water. In some liquid foods, such as milk and cream, all of the solids have a food value and ought to be preserved, while in other liquid foods and beverages, such as tea and coffee, there are ingredients of no value for food and unnecessary to preserve. Where all the ingredients of a liquid food have a food value, gelatin is mixed therewith and the mixture heated sufficiently to dissolve the gelatin in the water without altering the chemical composition of the food ingredients. Then the mixture is dried in any suitable manner, as in evaporating-pans, or preferably on large flat plates onto which it is poured so as to spread out in thin sheets. The dried mixture thus contains all the original ingredients of the food with only the water driven off and can be reconverted into its original form by the mere addition of water and the application of slight heat to dissolve the solids and gelatin. It is preferable to granulate or pulverize the dried sheets to facilitate their solution and because the preservative action of the gelatin seems to be increased thereby. In order to prevent the gelatin from coagulating when the reconverted mixture is cooled, the volume of gelatin should not exceed one per cent. of the volume of water therein. When reconverted into its former condition, the liquid has its natural taste and appearance; but the dried mixture may be used as a solid in the shape of sheets, tablets, or comminuted particles with the same taste as the original liquid.

In the case of tea and coffee and similar articles a decoction or infusion thereof is first made which extracts all the useful ingredients. Then the decoction or infusion is strained through a filter to remove all solids not held in solution. The filtrate is then treated with gelatin and dried, as in the process described above. As the decoction or infusion of tea and coffee contains tannin in solution, it is preferable to remove the tannin by adding a little gelatin to the decoction before filtering, the effect being that the gelatin and tannin coagulate and remain as a sediment in the filter.

Meat may be treated by subjecting it to great pressure to squeeze out the natural juices and then treating them with gelatin and drying, as in the process of preserving milk. Much better results are obtained, however, by mincing the meat and then treating the pieces with water acidulated with hydrochloric acid. The quantity of hydrochloric acid is preferably about one-tenth of one per cent. of the amount of water, and sulfuric or phosphoric acid may be used in like proportion instead of hydrochloric acid. So, too, citric, lactic, tartaric, or acetic acid in the proportion of about two per cent. (from one to four per cent.) of the amount of water may be used instead of hydrochloric acid, and I intend that all of these acids being equivalent to hydrochloric shall be included by the words "hydrochloric acid" as used in the annexed claims. The native albumen is thereby dissolved in the acidulated water and converted into an acid albumen which is easy to digest. The mixture is then filtered to separate the solid matter, pressure being preferably applied to press out all the juices and solution. If the filtrate contains fine particles of fiber or other solid matter in suspension, they may be removed by the use of gelatin or isinglass or by filtering a second time. The liquid thus clarified contains nearly all the ingredients of meat which have a food value and is treated with gelatin and dried and granulated, as in the process of preserving milk.

In the case of articles all of whose ingredients are to be preserved—such as eggs, antitoxin, and other pharmaceutical preparations—they are mixed or diluted with water, if necessary, and then treated with gelatin and dried, as in the process above described.

The following is my theory of the action of the gelatin: I have discovered that gelatin has the property of maintaining a hygroscopic equilibrium with the atmosphere—that is, it absorbs moisture from the atmosphere and gives off moisture to the atmosphere with considerable rapidity so long as they are unequally charged with moisture. In my process the evaporation of the water from the liquid solution leaves the gelatin in intimate contact with the food particles, and by reason of its hygroscopic properties the gelatin absorbs the moisture from such particles and gives off any excess of moisture to the atmosphere. The moisture, which is necessary to support putrefaction, is thus absorbed and eliminated, and the product may be preserved, in granulated form. In the case of articles containing fats or other substances specially liable to putrefy it is desirable after treating them with gelatin and drying them to dip the dried sheets into liquid gelatin for the purpose of forming a protective coating for the food ingredients; but this coating acts to exclude the air from the food particles, whereas the gelatin dissolved in the food solution acts as above stated and is not dependent upon the exclusion of air. Obviously this coating of gelatin may be applied in other ways than that specified.

Instead of preserving different articles separately several articles may be combined and preserved together as a food preparation of special use for travelers, soldiers, ship-stores, and similar purposes. The following process produces an especially valuable composition: A quantity of meat is cut up and treated with water acidulated with hydrochloric or equivalent acid. The water and juices may then be filtered out under pressure and the solid residue boiled in water with suitable condiments to make a bouillon which is added to the filtered liquid, or the meat may be boiled in the acidulated and salted water with suitable condiments under high pressure to dissolve all the soluble matter, and then the mixture is cleared by filtering or otherwise. In either case the yolks of eggs are added in such proportion as will supply a proper amount of emulsified fat and will be agreeable to the taste, and then sugar of milk is preferably added in considerable quantity. Gelatin to the amount of about one per cent. of the liquid volume is dissolved therein, and the whole mixture is evaporated to dryness in thin sheets or tablets and ground into small particles. The grinding not only facilitates the solution of the particles, but experiments appear to indicate that the ground particles are better preserved than the sheets and tablets. The quantity of sugar of milk is discretionary. I prefer to use a considerable quantity; but it may be omitted entirely.

What I claim as new, and desire to secure by Letters Patent, is—

1. The improvement in the process of preserving which consists in dissolving about one per cent. of gelatin in a liquid consisting of or containing the article to be preserved and then drying and granulating the mixture, substantially as and for the purpose set forth.

2. The improvement in the process of preserving which consists in dissolving about one per cent. of gelatin in a liquid consisting of or containing the article to be preserved and then drying the mixture, substantially as and for the purpose set forth.

3. The process of preserving which consists in dissolving the article to be preserved in water, filtering the water solution, adding about one per cent. of gelatin to the filtered liquid and then drying and granulating the dried mixture, substantially as and for the purpose set forth.

4. The process of preserving which consists in dissolving the article to be preserved in water, filtering the water solution, adding about one per cent. of gelatin to the filtered liquid and then drying, substantially as and for the purpose set forth.

5. The process of preserving meat-juices which consists in treating the meat with water acidulated with hydrochloric acid, filtering the mixture, adding about one per cent. of gelatin to the filtered liquid and then drying and granulating the mixture, substantially as described.

6. The process of preserving meat-juices which consists in treating the meat with water acidulated with hydrochloric acid, filtering the mixture, adding about one per cent. of gelatin to the filtered liquid and then drying, substantially as described.

7. The process of preserving meat-juices which consists in treating the meat with water acidulated with hydrochloric acid, filtering the mixture, adding a small quantity of gelatin to clarify the liquid, and again filtering and then adding about one per cent. of gelatin and drying and then granulating the dried mixture, substantially as described.

8. The process of preserving meat-juices which consists in treating the meat with water acidulated with hydrochloric acid, filtering the mixture, adding a small quantity of gelatin to clarify the liquid, and again filtering and then adding about one per cent. of gelatin and drying, substantially as described.

9. As an article of manufacture, the food preparation consisting of meat-juices treated with hydrochloric acid, yolk of egg and gelatin, the quantity of gelatin being about one per cent. of the original liquid volume, all dried and granulated, substantially as described.

10. As an article of manufacture, the food preparation consisting of meat-juices treated with hydrochloric acid, yolk of egg and gelatin, the quantity of gelatin being about one per cent. of the original liquid volume, all dried, substantially as described.

11. As an article of manufacture, the food preparation consisting of meat-juices treated with hydrochloric acid, yolk of egg, sugar of milk and gelatin, the quantity of gelatin being about one per cent. of the original liquid volume, all dried and granulated, substantially as described.

12. As an article of manufacture, the food preparation consisting of meat-juices treated with hydrochloric acid, yolk of egg, sugar of milk and gelatin, the quantity of gelatin being about one per cent. of the original liquid volume, all dried, substantially as described.

13. As an article of manufacture, a comminuted food product consisting of the solid food elements of liquid foods and gelatin, the volume of gelatin being about one per cent. of the original volume of water in such foods, substantially as described.

14. As an article of manufacture, a food product consisting of the solid food elements of liquid foods and gelatin, the volume of gelatin being about one per cent. of the original volume of water in such foods, substantially as described.

15. As an article of manufacture, a prepared article consisting of the original food elements with the water eliminated, and gelatin, the volume of gelatin being about one per cent. of the original volume of water, all dried and granulated, substantially as described.

16. As an article of manufacture, a prepared article consisting of the original food elements with the water eliminated, and gelatin, the volume of gelatin being about one per cent. of the original volume of water, all dried, substantially as described.

17. As an article of manufacture, the food preparation consisting of meat-juices treated with hydrochloric acid, bouillon, yolk of egg and gelatin, the quantity of gelatin being about one per cent. of the original liquid volume, all dried and granulated, substantially as described.

18. As an article of manufacture, the food preparation consisting of meat-juices treated with hydrochloric acid, bouillon, yolk of egg and gelatin, the quantity of gelatin being about one per cent. of the original liquid volume, all dried, substantially as described.

St. Louis, Missouri, December 1, 1900.

PHILIPP GEORGE RICHTER.

In presence of—
JAMES A. CARR,
HENRY A. KERSTING.